United States Patent [19]

Sen

[11] Patent Number: 5,287,246
[45] Date of Patent: Feb. 15, 1994

[54] DRAWER TYPE TRACK BALL FOR PORTABLE COMPUTERS

[75] Inventor: Tony Sen, Taipei, Taiwan

[73] Assignee: Orete Systems, Inc., Taipei, Taiwan

[21] Appl. No.: 888,718

[22] Filed: May 27, 1992

[51] Int. Cl.$^5$ .......................... H05K 7/02; G06F 1/16; H05K 7/14

[52] U.S. Cl. ...................................... 361/683; 361/727

[58] Field of Search ............... 340/706, 709, 710, 711; 341/22; 364/708, 706, 709.01, 709.1, 709.11, 708.1; 235/1 D, 145 R, 146; 361/380, 390–395, 399, 679–687, 724–727; D14/100, 106, 114, 115; D21/13, 48

[56] References Cited

U.S. PATENT DOCUMENTS 5,021,771  6/1991  Lachman .............................. 340/709
5,231,380  2/1993  Logan ................... 340/706

FOREIGN PATENT DOCUMENTS 2069197  8/1981  United Kingdom ................ 361/380

Primary Examiner—Gerald P. Tolin
Assistant Examiner—Michael W. Phillips
Attorney, Agent, or Firm—Lowe, Price, LeBlanc & Becker

[57] ABSTRACT

A drawer type cursor controller for portable computers mainly includes a drawer-like casing received in a lower part housing of a portable computer below a keyboard thereof for accommodating a track ball therein. The drawer-like casing for the track ball is slidably supported to be conveniently pushed into the lower part housing of the portable computer when the track ball is not in use, and is conveniently pulled out of the lower part housing of the portable computer when the track ball is to be manipulated. The drawer-like casing track ball is disposable at a pulled out position that permits an operator to use either right or left thumb to smoothly move the track ball in an ergonomically suitable position without hindering operation on the keyboard with other fingers.

1 Claim, 5 Drawing Sheets

DRAWER TYPE TRACK BALL FOR PORTABLE COMPUTERS

BACKGROUND OF THE INVENTION

1. Field of the Invention

The present invention relates to a drawer type cursor controller for portable computers, more particularly to a drawer type cursor controller which is mounted in a housing below the keyboard of a portable computer.

2. The Prior Art

Following the increasing development of information industry, computers have had dramatic changes in their appearance. Electronic calculators in the earlier days consisted of vacuum tubes and usually occupied tremendous space. A simple computer might have to occupy at least one or two rooms. After the introduction of ICs, the volume of a computer was largely reduced. The recent development of VLSIs, further simplified both the structure and the volume of computers. For general computers, although the structure is simplified and the volume occupied is largely reduced, the monitor and system unit still occupied some space which makes the computers unsuitable for carrying. Portable computers were thereby developed. In the United States and Japan, such portable computers are much more welcome and popular than general computers. In Japan, such portable computers are referred to as Word Processor or WP, and become a necessary typing tool for general office-family, housewives, and students. However, since such portable computers have more functions than a typewriter, they are largely welcome in the USA market, too.

On the other hand, since the programming in the information industry tends to provide more and more simpler and easy-to-use products, application programs using a cursor controller has become the main stream in the computer field. Conventional cursor controller is a separate mouse or track ball which is inconvenient either in mounting or carrying. Connection wires across table top are both bothersome, too. The present invention meets the need for a cursor controller which can be integrally attached to a keyboard so that it will not occupy additional space while it is very convenient in operation.

As shown in FIG. 1, a common portable computer mainly consists of a top part 21, a monitor 22, a bottom part 11, a keyboard 12, and a cursor controller 4. The top part 21 is pivotly connected to the bottom part 11 with a pivot mechanism 3 so that the top part 21 may pivotly turn relative to the bottom part 11. Two entry control buttons 5 are provided beside the cursor controller 4 to control the on/off of the cursor controller 4.

FIG. 2 illustrates the operation of such conventional portable computer. Facing the monitor 22, a user enters and edits data with the keyboard 12. When the user wants to manipulate the cursor controller 4 located at upper portion of the keyboard 12, it is very inconvenient for him or her to reach across the keyboard 12 toward the cursor controller 4. The cursor controller 4 as referred to in this specification is a track ball with which the cursor on the screen may be freely moved in any and all directions.

Among the five fingers, the thumb gives the largest extent of movement and turns the track ball in more directions than any other four fingers. However, the cursor controller 4 provided with the conventional portable computers is generally located at upper left corner of the keyboard 12, hence it can not be conveniently manipulated by a left hand thumb without bending the left elbow at the same time. On the other hand, if the cursor controller 4 is to be manipulated with the right hand thumb, the user must diagonally reach out his or her right hand toward the upper left corner of the keyboard 12 which will inevitably hinder the movement of the user's left hand on the keyboard 12. If the other four fingers on the right hand are used to manipulate the cursor controller 4, limited extent of movement thereof and hindrance to the left hand will both exist.

In view of the above-mentioned disadvantages existing in the cursor controller for conventional portable computers, the present invention is developed to eliminate such drawbacks.

SUMMARY OF THE INVENTION

The primary object of the present invention is to provide a drawer type cursor controller for portable computers. The cursor controller according to the present invention can be mounted within the bottom part of the computer below the keyboard and be conveniently drawn out for use at any time. When the controller is not in use, it may be pushed into the bottom part of the computer, being flush with the outer surface of the bottom part and therefore giving a beautiful appearance thereof. To use the controller, simply draw it out of the bottom part and manipulate it with either left or right thumb in an ergonomically suitable position.

Another object of the present invention is to provide a drawer type cursor controller for portable computers which has an outer bottom surface being flush with a bottom plate of the bottom part of the computer but being provided with a groove near its lower front edge. With this structure, the drawer type cursor controller may be easily pulled out of the bottom part of the computer for use at any time.

BRIEF DESCRIPTION OF THE DRAWINGS

A more complete understanding of these and other features and advantages of the present invention will become apparent from a careful consideration of following detailed description of certain embodiments illustrated in the accompanying drawings wherein.

DETAILED DESCRIPTION OF THE PREFERRED EMBODIMENTS

Figure 1:
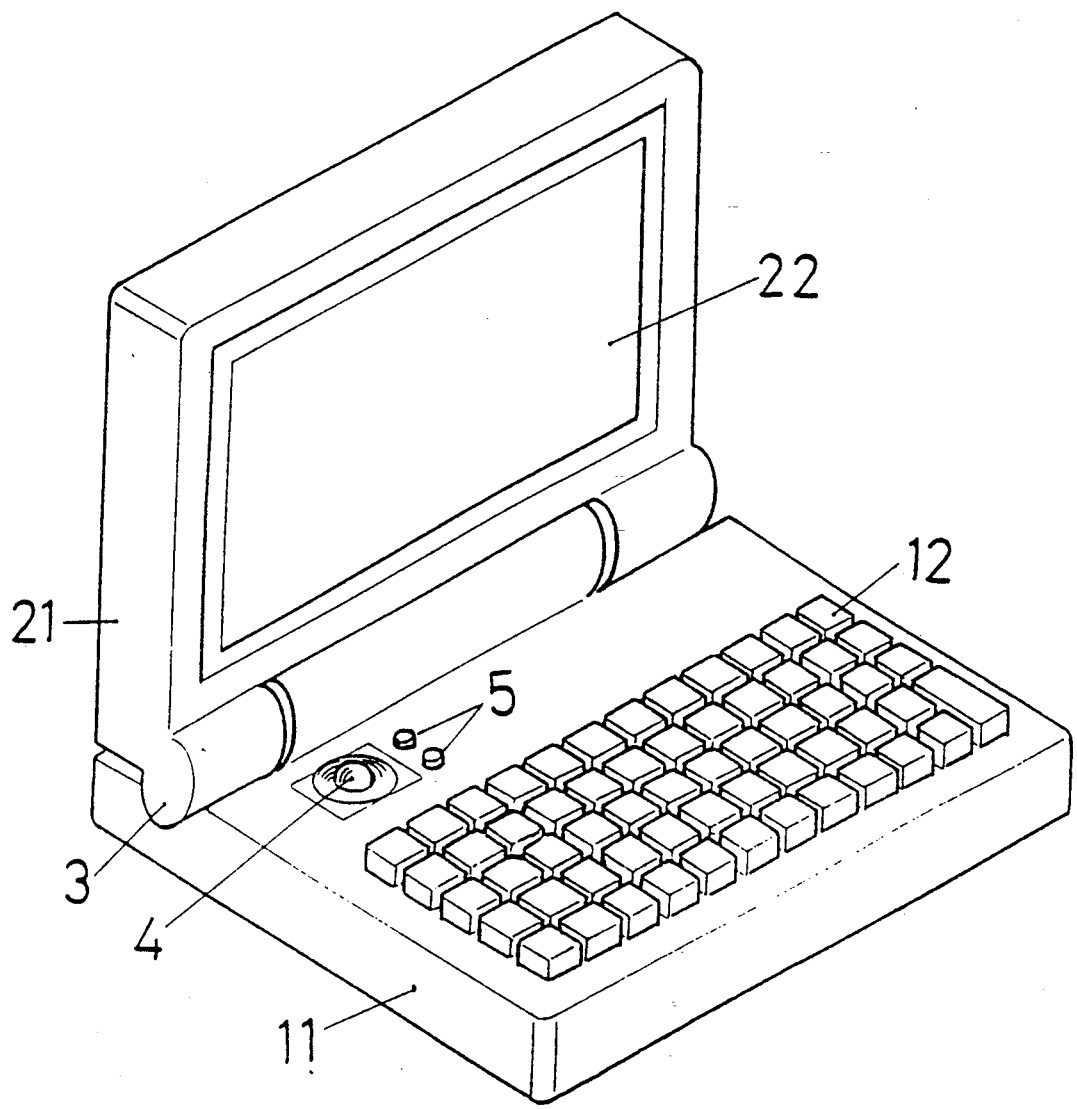
FIG. 1 is a three-dimensional perspective of a conventional portable computer.
Figure 2:
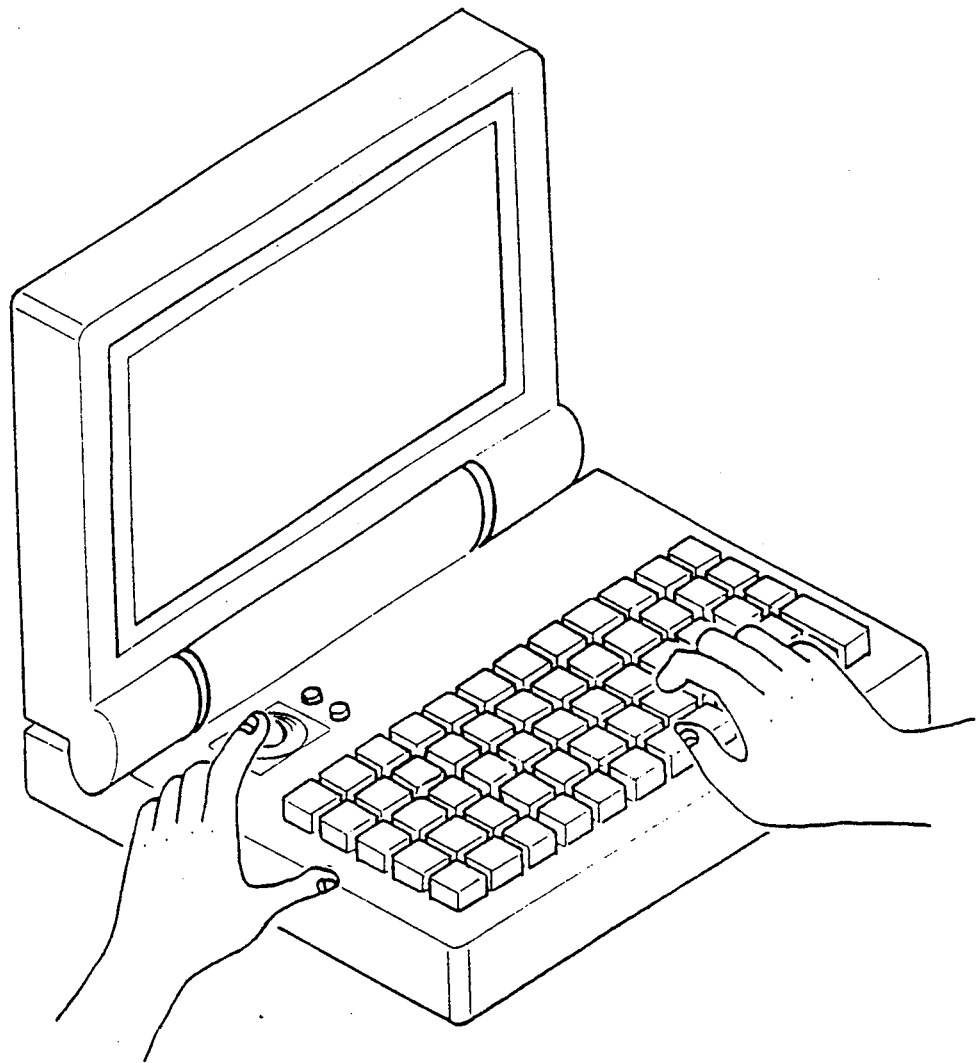
FIG. 2 illustrates the operation of a cursor controller, a track ball in this case, on a conventional portable computer.
Figure 3:
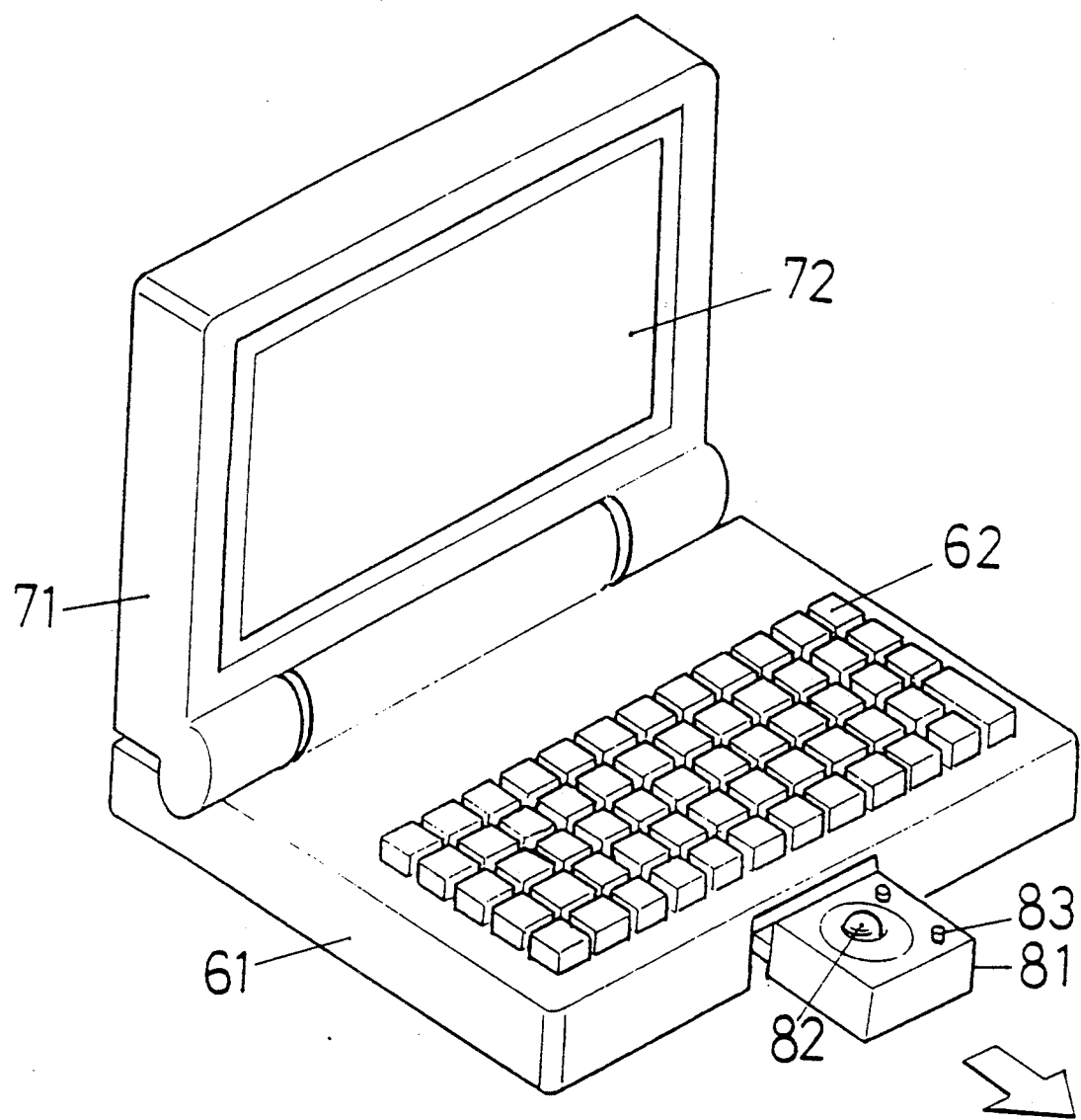
FIG. 3 is a three-dimensional perspective of a portable computer with a drawer type cursor controller according to the present invention.
Figure 5A:
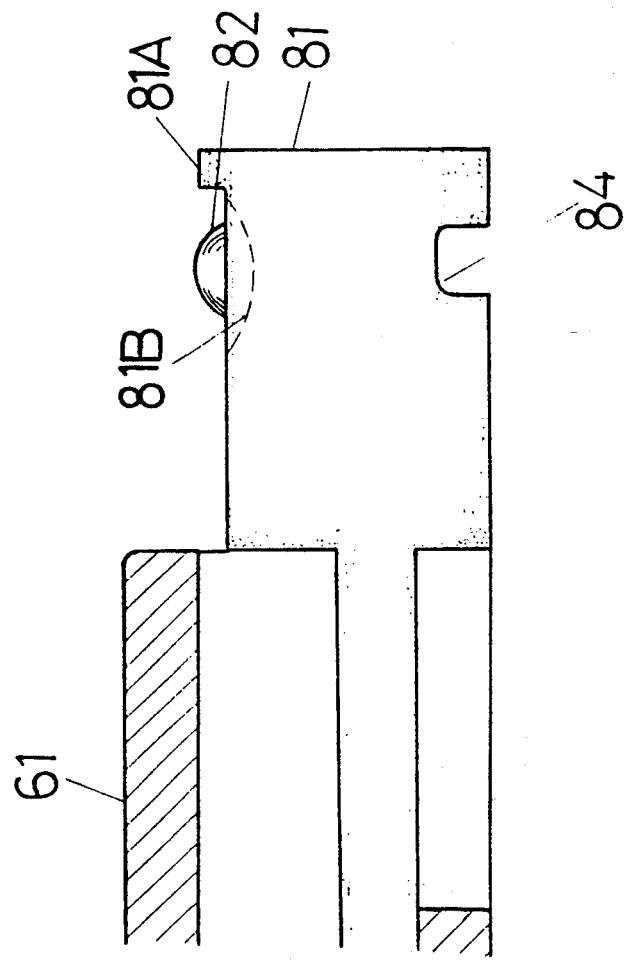
FIG. 5A is a fragmental, side vertical sectional view showing the drawer type cursor controller of the present invention at a pushed in position in the bottom part of the portable computer.
Figure 5B:
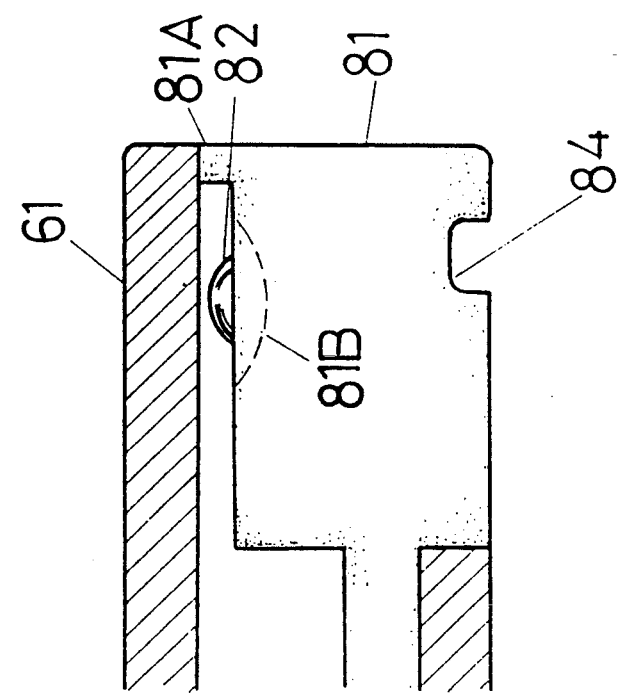
FIG. 5B is a fragmental, side vertical sectional view showing the drawer type cursor controller of the present invention at a pulled out position.

Please refer to FIG. 3 in which a portable computer with a drawer type cursor controller according to the present invention is shown. It can be seen from the figure that a drawer-like casing 81 is provided and disposed centrally within a bottom part 61 below a keyboard 62 of a portable computer. A cursor controller 82 (a track ball in this case) and several switches 83 are arranged within the drawer-like casing 81. Please refer to FIGS. 5A, 5B for the detailed sectional views of the drawer-like casing 81. As shown in FIGS. 5A and 5B, the drawer-like casing 81 has an outer periphery flush with outer surface of the bottom part 61 of the portable computer. In consideration of the possible projection of the cursor controller 82 from the top surface of the drawer-like casing 81, an upward front rib 81A in top front of the drawer-like casing 81 or a recess 81B at an adequate position thereof for accomodating the track ball of the cursor controller 82 may be provided in such manner that the track ball 82 would not project out of the utmost top line of the drawer-like casing 81 in any case. A groove 84 is further formed near bottom front edge of the drawer-like casing 81 so that the drawer-like casing 81 may be easily pulled out of the bottom part 61 by user with fingers, as shown in FIG. 5B.

Figure 4:
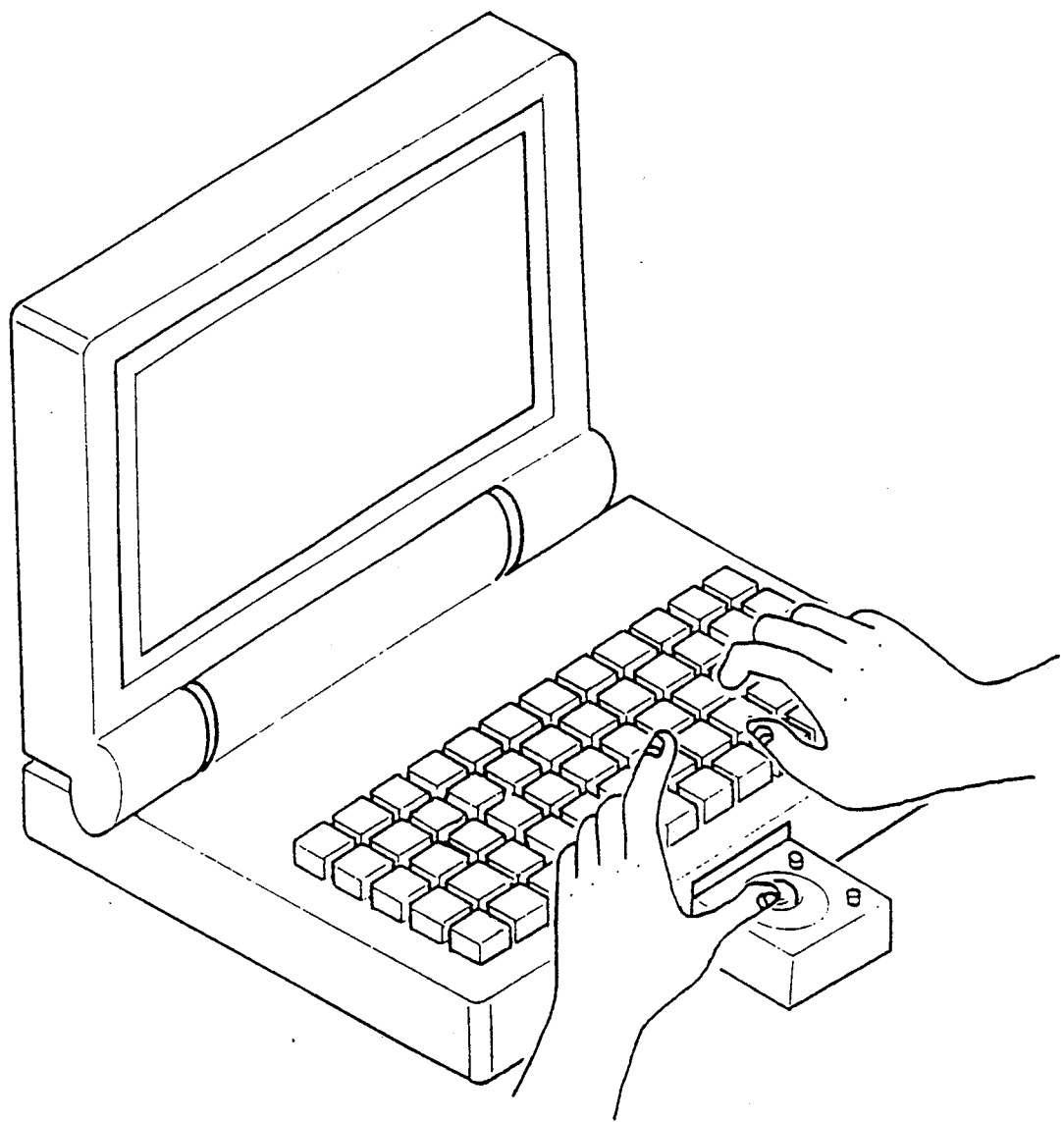
FIG. 4 illustrates the operation of the drawer type cursor controller on a portable computer according to the present invention.

FIG. 4 illustrates the operation of the cursor controller of the present invention on a portable computer. First the drawer-like casing 81 is pulled out of the bottom part 61 of the portable computer permitting the cursor controller 82 to completely appear centrally in front of the keyboard 62. When an operator enters data via the keyboard 62, he or she may manipulate the cursor controller or the track ball 82 with his or her left or right thumb at any time during keyboard operation. In this manner, the track ball 82 may be very smoothly moved with the thumb while the other four fingers of the same hand can still operate the keyboard without interference.

From the above description, it can be seen that the drawer type cursor controller for a portable computer according to the present invention can be operated in an ergonomically suitable position without hinder the normal operation of keyboard by other fingers. Meanwhile, it can be easily and safely contained in the portable computer when it is not in use while give a flush and beautiful appearance of the computer.

Although the present invention has been described with a certain degree of particularity, the present disclosure has been made by way of example and changes in details of structure may be made without departing from the spirit thereof.

We claim:

1. A drawer type cursor controller for a computer, comprising:
   a drawer-like casing, received in a lower part of a housing of a computer below a keyboard thereof, for accommodating an input means therein;
   means for slidably supporting said drawer-like casing; and
   input means disposed in the drawer-like casing to be conveniently pushed into said lower part when said cursor controlling means is not in use and being able to be conveniently pulled out of said lower part when said cursor controlling means is to be manipulated, said input means consisting of a track ball,
   wherein said casing is supported to be slidable to a pulled out position centrally in front of the keyboard that permits an operator to use either right or left thumb to smoothly move said track ball without hindering operation on said keyboard by said operator with other fingers of either hand.

* * * * *

UNITED STATES PATENT AND TRADEMARK OFFICE
CERTIFICATE OF CORRECTION

PATENT NO. : 5,287,246

DATED : February 15, 1994

INVENTOR(S) : Tony SEN

It is certified that error appears in the above-indentified patent and that said Letters Patent is hereby corrected as shown below:

On title page, delete item [73] and insert the following therefor:

--[73] Assignee: Crete Systems, Inc., Taipei, Taiwan--

Signed and Sealed this

Fifth Day of July, 1994

Attest:

BRUCE LEHMAN

*Attesting Officer*   *Commissioner of Patents and Trademarks*